April 11, 1967  L. E. WOLFGANG  3,313,558
TRACTOR HITCH
Filed April 21, 1965  2 Sheets-Sheet 1
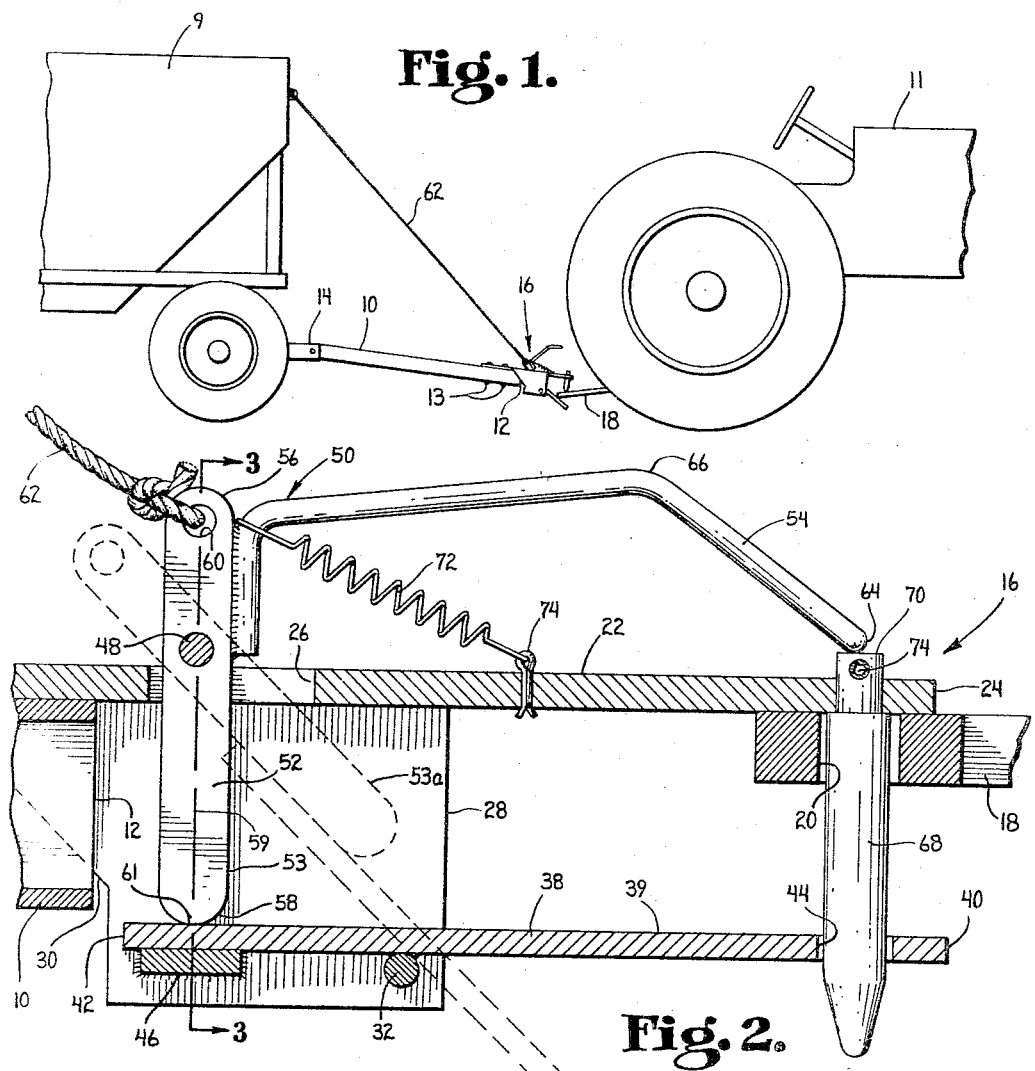
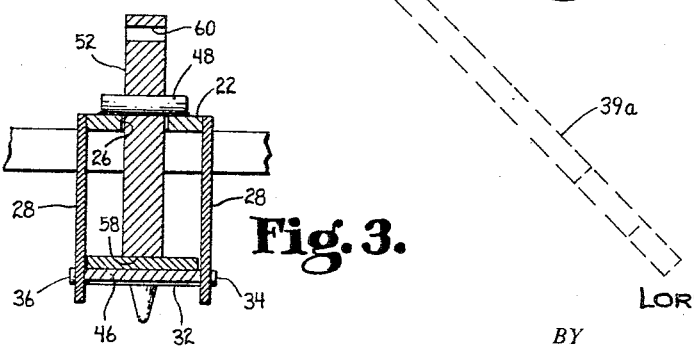
INVENTOR.
LOREN E. WOLFGANG
BY
Hood, Gust & Irish
Attorneys

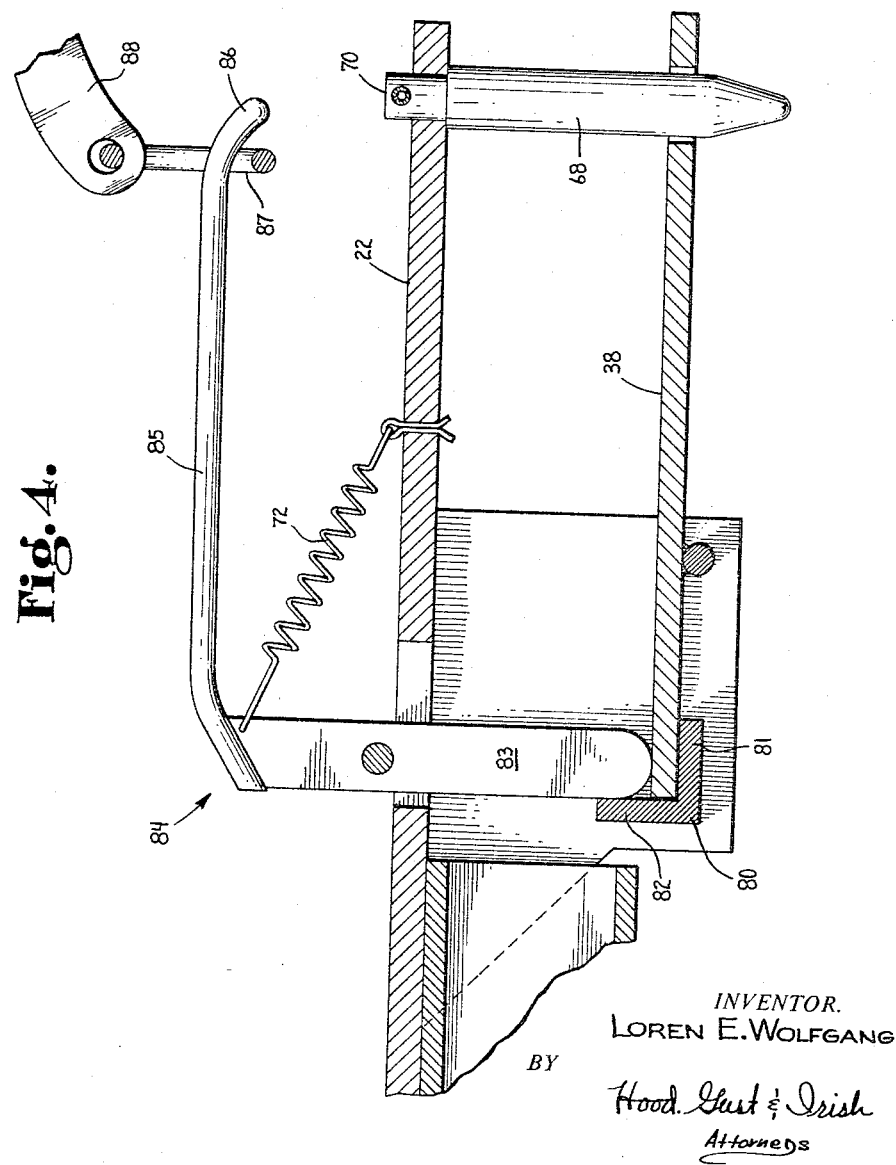

United States Patent Office 3,313,558
Patented Apr. 11, 1967

3,313,558
TRACTOR HITCH
Loren E. Wolfgang, R.R. 1, Fortville, Ind. 46040
Filed Apr. 21, 1965, Ser. No. 449,728
15 Claims. (Cl. 280—515)

The present invention relates to a vehicle hitch, and more particularly to a vehicle hitch which can be easily engaged and disengaged. Many vehicle hitching devices have been proposed that are suitably strong and that secure one vehicle to another. However, it is desirable that a vehicle hitch be constructed so that vehicles can be easily disconnected when desired. Some vehicle hitching devices that have been proposed and so constructed have not provided a secure connection between vehicles which can be confidently relied upon to remain coupled until the two vehicles are desirably disconnected. Others have been so mechanically complex that maintenance has been a problem. Therefore, it is desirable to provide a mechanically simple device which provides a suitably strong and secure connection between the vehicles, but which can be easily connected and disconnected when desired.

It is therefore an object of this invention to provide an improved vehicle hitch which can be selectively engaged and disengaged.

It is another object of this invention to provide an improved vehicle hitch which provides a secure connection between two vehicles.

A further object of this invention is to provide a mechanically simple and suitably strong vehicle hitch which provides a secure connection between two vehicles and which can be easily engaged and disengaged when desired.

A still further object is to provide such a hitch which may be readily opened by means of hydraulically-operated means conventionally carried on a tractor.

Further objects of the invention will appear as the description proceeds.

To the accomplishment of the above and related objects, my invention may be embodied in the forms illustrated in the accompanying drawings, attention being called to the fact, however, that the drawings are illustrative only and that change may be made in the specific constructions illustrated and described, so long as the scope of the appended claims is not violated.

In the drawings:

FIG. 1 is a diagrammatic and fragmentary side view of the improved vehicle hitch of this invention shown attached to one vehicle and in approximate position to be connected to a second vehicle;

FIG. 2 is an enlarged, fragmentary side view, partially in section, of the improved vehicle hitch of this invention in connecting position;

FIG. 3 is a reduced, cross-sectional view of the improved vehicle hitch of this invention, taken substantially along section line 3—3 of FIG. 2; and FIG. 4 is a view similar to FIG. 2 but showing a modified form of hitch and somewhat diagrammatically suggesting how it can be manipulated by the hydraulically actuated element of a conventional tractor.

In the broader aspects of this invention, there is provided the vehicle hitch comprising a vehicle tongue having a distal end, a coupling means secured to the tongue adjacent the distal end and depending downwardly, a lever means having an opening therein and mounted beneath the tongue so as to be swingable from a first position in which the coupling means is inserted through the opening in the lever to other positions downwardly and away from the tongue, and a means for holding the lever in the first position and for selectively allowing the lever to move as aforementioned.

Referring to the drawings, I have suggested a wagon or other vehicle 9 to be towed and provided with a conventional tongue 10 having a distal end 12 and a hinged joint 14 spaced therefrom. A hitch, constructed in accordance with the present invention and indicated generally by the reference numeral 16, is secured to the tongue 10 adjacent its distal end 12; and I have suggested a second vehicle, such as a tractor 11, provided with a draw bar or tongue 18 which has an opening 20 therein and which is to be connected to the tongue 10.

Referring now specifically to FIGS. 2 and 3, a tongue extension 22 having a distal end 24 and an opening 26 spaced therefrom is secured to the tongue 10 adjacent its distal end 12. In this embodiment, tongue extension 22 overlaps tongue 10 and is secured thereto by means of bolts 13. A pair of side plates 28 are secured to and depend from the tongue extension 22 on both sides of the opening 26 and have gusset portions 30 which are secured to the tongue extension 22 and extend away from distal end 24. Side plates 28 support a rock shaft 32 whose opposite ends 34, 36 are journalled in said side plates and which extends beneath the tongue extension 22 in spaced-apart and substantially parallel relationship therewith. A lever or rocker element 38 having opposite ends 40, 42 and an opening 44 adjacent end 40 is secured to rock shaft 32 between the side plates 28 and intermediate the ends 40, 42. Rock shaft 32 supports the lever 38 to swing so as to move end 40 toward and away from the tongue extension 22. During such movement, the rock shaft 32 acts as the fulcrum of the lever 38. Rock shaft 32 is desirably placed closer to end 42 than end 40 so as to place end 42 between the side plates 28 and to provide that the movement of end 40 away from the extension 22 is urged by the force of gravity. A stop plate 46 is provided to engage the bottom of lever 38 adjacent end 42 when the lever 38 is in its position shown in solid lines as at 39 and substantially parallel to the tongue extension 22. Stop plate 46 extends between the side plates 28 and is secured to the side plates 28 at its opposite ends. Stop plate 46 prevents any movement of the end 40 of the lever 38 closer to the extension 22 than that distance achieved when lever 38 is in position 39.

An axle 48 is secured to the tongue extension 22 on opposite sides of the opening 26 so as to span the opening 26 and to be registry with the stop plate 46. Journalled on the axle 48 intermediate its ends and centrally located in the opening 26 is a bell crank lever 50. Bell crank lever 50 has a first arm portion 52, and a second arm portion 54 with an elbow 56 therebetween. In the specific embodiment illustrated, the bell crank lever 50 is fabricated by securing the first and second arm portions 52, 54 together adjacent the elbow 56 by welding, brazing or other suitable means; however, it is entirely within the scope of this invention to fabricate the bell crank lever 50 as a single piece. First arm portion 52 extends through the opening 26 and the elbow 56 and the distal end 58 are on opposite sides of the tongue extension 22. Adjacent the elbow 56 is an opening 60 in the first arm portion 52 in which a cord 62 is secured. The precise purpose for the cord 62 will become apparent hereinafter. The elbow 56 and the securance of the cord 62 are by this method of attachment of the bell crank lever 50 spaced from the tongue extension 22 and the axle 48.

The bell crank lever 50 is oscillable about the axle 48 and movable from the position shown in solid lines 53 in which the distal end 58 of the first arm portion 52 engages the lever 38 adjacent end 42 and the first arm portion 52 is substantially vertical and in which the lever 38 is held in position 39 between the end 58 and the stop plate 46, through a series of intermediate positions to a position shown in dashed lines 53a, allowing the lever 38 to swing into the position shown in dashed lines 39a.

Distal end 58 is arcuate for reasons which will become apparent hereinafter.

The second arm portion 54 of the bell crank lever 50 extends from the elbow 56 over and longitudinally of the tongue extension 22. Arm portion 54 has a distal end 64 and is bent away from the tongue extension 22 at a point 66 intermediate end 64 and elbow 56. A coupling pin 68 is secured to the tongue extension 22 adjacent its distal end 24 and depends downwardly therefrom. The nether region of coupling pin 68 is received in the opening 44 in the lever 38, and thus enshrouded by said lever, whenever the lever 38 is in position 39. Coupling pin 68 has an end 70 which extends above the tongue extension 22. In this form of the invention, end 64 of the second arm portion 54 of the bell crank lever 50 engages pin end 70 whenever the first arm portion 52 is in position 53 so as to prevent arm portion 52 from moving beyond the substantially vertical position 53 in which the bell crank lever 50 securely holds the lever 38 in its position 39 between its distal end 58 and the stop plate 46. When bell crank lever 50 is in position 53, the point 61 at which distal end 58 is tangential to lever 38 is located intermediate end 42 of lever 38 and the intersection of a line 59 drawn perpendicular to the lever 38 and through the center of axle 48. In FIG. 2 this line coincides with section line 3—3.

A spring 72 is secured at one end to the elbow 56 of the bell crank lever 50 and at the other end to tongue extension 22 at a position intermediate the opening 26 and the securance of the connecting pin 68 by means of a cotter pin 74. Spring 72 resiliently holds the bell crank lever 50 in position 53 which in turn holds the lever 38 in the position 39. With the bell crank lever 50 in the position 53, the bell crank lever 50 is fixedly held in position 53 by the combination of the force exerted by the spirng 72 and the fact that the first arm portion 52 is in a slightly out-of-vertical position and must be turned through the vertical position when moved. No amount of jostling, therefore, will cause bell crank lever 50 to move toward position 53a.

In a specific embodiment of this invention, the cord 62 can be a sufficiently strong rope, a chain, or a metal cable; the spring 72 may be any sufficiently strong coil spring; all of the other elements of this invention may be fabricated of any suitably strong metal, such as steel; and the coupling pin 68 and the lever 38 may be surface hardened by conventional techniques so as to more readily withstand abrasion. Further the securance of all metal elements to other metal elements other than aforementioned can be achieved by welding, brazing, or other suitable means.

In operation, the vehicle hitch 16 can be automatically engaged to the vehicle tongue 18 and disengaged when desired. To engage the hitch 16 to the tongue 18, the vehicle to which the tongue 18 is attached is backed up toward the hitch 16 which has lever 38 and bell crank lever 50 in positions 39a, 53a, respectively, as shown by the dotted lines in FIG. 2. Hitch 16 is placed in this open position by applying a force to the cord 62 to turn the bell crank lever 50 so as to move end 64 away from the coupling pin 68 and to move the first arm portion 52 into the position 53a. With the bell crank lever 50 in position 53a, the lever 38 moves by the force of gravity into the position 39a, thus unshrouding the nether region of the coupling pin 68. As the vehicle tongue 18 is moved toward the open hitch 16, the vehicle tongue 18 may engage the lever 38 and slide upon the lever 38 upwardly toward the rock shaft 32. Any substantial difference in elevation between the vehicle hitch 16 and vehicle tongue 18 is minimized by flexing of the vehicle tongue 10 at its hinged joint 14. This adjustment in elevation of the vehicle tongue 10 also can be made by applying additional force to the cord 62. By this means, vehicle tongue 18 is positioned within the vehicle hitch 16 such that the opening 20 is in registry with the coupling pin 68. The force which is being exerted on the bell crank lever 50 by means of the cord 62 is then released. Upon the release of cord 62, the vehicle hitch 16 is automatically closed and lever 38 and bell crank lever 50 are moved into the positions 39, 53, respectively, as shown in FIG. 2 by the urging of spring 72. In this closed position, the vehicle tongue 18 is secured to the tongue 10 by means of the coupling pin 68 passing through the opening 20 and is located intermediate the tongue extension 22 and the lever 38.

To disengage the vehicle hitch 16 and disconnect the tongue 18 from the coupling pin 68, force is again applied to the cord 62 to urge the bell crank lever 50 into position 53a so as to allow lever 38 to drop into position 39a. Then, by further force being added to the cord 62, the hitch 16 can be lifted up and away from the vehicle tongue 18 thereby removing the coupling pin 68 from the opening 20 and allowing the vehicle to which the tongue 18 is attached to be driven away.

It can thereby be seen that the hitch 16 can be easily connected and disconnected by a person on either vehicle or standing beside the vehicles by merely making it possible for him to rotate the bell crank lever 50 from the position 53 to the position 53a. Further, it will be seen that the vehicle hitch 16 connects the tongues 10, 18 in a secure manner and that disconnection cannot take place until the bell crank lever 50 is moved out of position 53 by means of a force applied to cord 62.

An alternative arrangement, whereby the hitch may be opened from the tractor seat by manipulation of hydraulic mechanism conventionally embodied in the tractor, is suggested in FIG. 4. In this embodiment of the invention, the stop member 46 is replaced by a stop member 80 which may be an angle iron having perpendicularly related flanges 81 and 82. The flange 81 occupies the same position relative to the other elements of the hitch that is occupied by the stop 46 of the previously described embodiment, while the flange 82 is so positioned that, when the arm 83 of the bell crank lever 84 reaches the "hold" position described above in connection with the arm 52, said arm 83 encounters, and is stopped by, the flange 82.

Because of the provision of the stop means 82, it is not necessary, in this embodiment of the invention, to design the arm 85 of the lever 84 to contact the pin 68 or any other surface fixed with respect to the member 82, and therefore said arm 85 may be provided at its distal end with a hook 86 which, when the lever 84 is in its illustrated position, is sufficiently spaced from the member 22 to permit the ring 87 of conventional hydraulically actuated mechanism 88 on the tractor to be operatively engaged with said hook.

Thus, with this embodiment of the invention, the tractor may be backed toward the vehicle to be towed and the operator may concurrently manipulate the hydraulic mechanism 88 to slip the ring 87 over the hook 86 of the lever arm 85. The mechanism 88 may then be raised to swing the lever 84 in a counter-clockwise direction to permit the distal arm of the rocker 38 to drop, thus unshrouding the nether portion of the coupling pin 68. Thereupon, the tractor may be further moved to bring its tongue 18 into registry with the pin 68 and, when the mechanism 88 is lowered, the spring 72 will actuate the lever 84 to lift the rocker arm into its illustrated relation to the pin 68.

I claim as my invention:

1. A vehicle hitch comprising a vehicle tongue having a distal end, a coupling means supported from said tongue and depending downwardly therefrom, a lever means having an opening therein adjacent one end, said lever means being rockably supported upon an axis intermediate its ends and located beneath said tongue, said lever means being movable from a first position in which said coupling means extends through said opening to a second position in which said one end is spaced downwardly below the nether end of said coupling means, and means engageable with said lever adjacent the other end of said lever and operable to move said lever from said first position to said second position and to lock said lever in said second position.

2. A vehicle hitch comprising a first generally horizontal member, a coupling pin depending from said member near the distal end of said member, a rocker element supported for oscillation about a fixed axis transverse with respect to the length of said member and disposed in a substantially horizontal plane between said member and the nether end of said coupling pin, said rocker element having a proximal arm extending from said axis away from the distal end of said member, stop means supported from said member substantially in the plane of said axis and positioned in the downward path of said proximal rocker element arm, said rocker element having a distal arm provided with an opening receiving and enshrouding a portion of said coupling pin when said proximal arm is in contact with said stop means, and cam means supported from said member and engageable with said proximal rocker element arm to move the same into contact with said stop means.

3. The vehicle hitch of claim 2 in which said distal arm of said rocker element is longer than the proximal arm thereof, whereby said distal arm is gravity biased away from said member to unshroud said coupling pin.

4. The vehicle hitch of claim 2 in which said cam means comprises a lever supported from said member for oscillation about an axis substantially parallel with and above said rocker element axis and in vertical registry with said stop means, said lever having a first arm depending from said lever axis into cooperative relation with said rocker proximal arm and having a second arm disposed above said member and extending toward the distal end of said member.

5. The vehicle hitch of claim 4 including spring means operatively engaging said lever and biasing said first arm toward substantially vertical position.

6. The vehicle hitch of claim 4 in which said first lever arm is proportioned and designed, when in substantially vertical position, to press said rocker proximal arm against said stop means.

7. The vehicle hitch of claim 6 in which said first lever arm is arcuately formed at its extremity and said lever is so proportioned and designed that, when the point of contact between said first lever arm and said proximal rocker arm is between the extremity of said rocker arm and a vertical line dropped from said lever axis, said second lever arm will engage a surface fixed with respect to said member.

8. The vehicle hitch of claim 6 including second stop means, said first lever arm being arcuately formed at its extremity and being so proportioned and designed that, when the point of contact between said first lever arm and said proximal rocker arm is between the extremity of said rocker arm and a vertical line dropped from said lever axis, said first lever arm will abut said second stop means.

9. A vehicle hitch comprising a vehicle tongue having a distal end and a first opening spaced therefrom, a pair of side plates secured to and depending from said tongue, a bell crank lever having first and second arm portions and an elbow therebetween, first means secured to said tongue for pivotally supporting said bell crank lever with said first arm portion extending downwardly through said first opening and said elbow elevated above said tongue, said bell crank lever being swingable from a first position in which said first arm portion is substantially vertical to move said first arm portion toward said distal end, resilient means for urging said bell crank lever into said first bell crank lever position, second means secured to said bell crank lever at said elbow for moving said bell crank lever against the urging of said resilient means, a coupling pin secured to said tongue adjacent said distal end and depending from said tongue, a lever having opposite ends and a second opening adjacent one of said lever ends, third means secured to said side plates for pivotally supporting said lever beneath said tongue, said lever being swingable from a first lever position in which said lever is substantially parallel to said tongue, so as to move said one end downwardly and away from said tongue, said coupling pin extending through said second opening when said lever is in said first lever position, and a stop secured to said side plates and engaging said lever adjacent the other lever end when said lever is in said first lever position, said stop preventing said one lever end from being rotated closer to said tongue, said stop and said bell crank lever in said first bell crank lever position cooperating to hold said lever in said first lever position.

10. A vehicle hitch comprising a vehicle tongue having a distal end and a first opening spaced therefrom, a pair of side plates secured to and depending from said tongue, a bell crank lever having first and second arm portions and an elbow therebetween, an axle mounted on said tongue and spanning said opening, said bell crank lever being journal mounted on said axle at a point of said first arm portion spaced from said elbow, said first arm portion extending downwardly through said first opening, said elbow being elevated above said tongue, said bell crank lever being swingable from a first position in which said first arm portion is substantially vertical to move said first arm portion toward said distal end, resilient means for urging said bell crank lever into said first bell crank lever position, means secured to said bell crank lever at said elbow for moving said bell crank lever against the urging of said resilient means, a coupling pin secured to said tongue adjacent said distal end and depending from said tongue, a lever having opposite ends and a second opening adjacent one of said lever ends, a rock shaft journalled in said side plates and extending therebetween, said lever being secured to said rock shaft, said lever being swingable from a first lever position in which said lever is substantially parallel to said tongue, so as to move said one end downwardly and away from said tongue, said coupling pin extending through said second opening when said lever is in said first lever position, and a stop secured to said side plates and engaging said lever adjacent the other lever end when said lever is in said first position, said stop preventing said one lever end from being rotated closer to said tongue, said stop and said bell crank lever in said first bell crank lever position cooperating to hold said lever in said first lever position.

11. A vehicle hitch comprising a vehicle tongue having a tongue distal end and a hinged joint therein, a tongue extension secured to said tongue distal end and having an extension distal end and a first opening spaced therefrom, a pair of side plates secured to and depending from said extension on both sides of said first opening respectively, a rock shaft having opposite ends, said rock shaft extending between said side plates and spaced apart from said extension, said ends being journalled in said side plates, a lever having opposite ends and a second opening adjacent one of said lever ends, said lever being secured to said rock shaft between said side plates and intermediate said lever ends, said rock shaft being the fulcrum of said lever, said lever being swingable so as to move said one lever end toward and away from said extension, the movement of said one lever end away from said extension being urged by gravity, the other lever end being between said side plates, a stop plate secured to and extending between said side plates, said stop plate engaging said other lever end when said lever is substantially parallel to said tongue and preventing movement of said one lever end closer to said extension and thereby forming a first lever position, a bell crank lever having first and second arm portions and an elbow therebetween, said arm portions having first and second distal ends respectively, an axle carried by said extension and spanning said first opening, said lever first arm portion being journal mounted on said axle intermediate said first distal end and said elbow, said first arm portion extending through said first opening, said elbow and said first distal end being on opposite sides of said extension respectively, said elbow being spaced from said extension, said bell crank lever being movable between a first bell crank lever position in which said first arm portion is substantially vertical and the said distal end thereof engages said lever adjacent said other end thereof so that said lever is held in said first lever position, and a second bell crank lever position which allows said one end of said lever to move away from said extension, resilient means for urging said bell crank lever into said first bell crank lever position, means secured to said first arm portion adjacent said elbow for moving said bell crank lever against the urging of said resilient means, and a coupling pin secured to said extension adjacent said extension distal end, said coupling pin depending from said extension and extending through said second opening when said lever is in said first lever position, said second arm portion being suspended from said elbow longitudinally of said extension, said second arm portion being bent away from said extension intermediate said second distal end and said elbow, said second distal end engaging said pin when said bell crank lever is in said first bell crank lever position preventing movement of the same from said second bell crank lever position beyond said first bell crank lever position.

12. The vehicle hitch of claim 11 wherein said first distal end of said first arm portion is arcuate and the point at which the same is tangential to said lever in said first bell crank lever position is intermediate said other lever end and the point at which a line drawn perpendicular to said lever and through the center of said second rock shaft intersects said lever.

13. The vehicle hitch of claim 11 further comprising a second vehicle tongue having a distal end and a third opening adjacent thereto, and wherein said pin is inserted through said third opening and said second tongue is positioned between said extension and said lever.

14. The hitch of claim 1 including spring means yieldably urging said last-named means toward lever-locking position.

15. The hitch of claim 1 in which said lever is yieldably biased toward said second position.

References Cited by the Examiner

UNITED STATES PATENTS

| | | | |
|---|---|---|---|
| 3,011,801 | 12/1961 | Neumann | 280—515 |
| 3,197,239 | 7/1965 | Jezek | 280—515 |

FOREIGN PATENTS

| | | |
|---|---|---|
| 937,035 | 9/1963 | Great Britain. |
| 1,097,290 | 1/1961 | Germany. |

BENJAMIN HERSH, *Primary Examiner.*

C. C. PARSONS, *Assistant Examiner.*